United States Patent [19]

Kotzan et al.

[11] Patent Number: 5,113,651
[45] Date of Patent: May 19, 1992

[54] AIR INJECTION SYSTEM DIAGNOSTIC

[75] Inventors: Joseph M. Kotzan, Clarkston; Gregory E. Labus, Grand Blanc, both of Mich.

[73] Assignee: General Motors Corporation, Detroit, Mich.

[21] Appl. No.: 678,373

[22] Filed: Apr. 1, 1991

[51] Int. Cl.⁵ .............................................. F01N 3/22
[52] U.S. Cl. ........................................ 60/274; 60/276; 60/277; 60/289
[58] Field of Search ............... 60/274, 276, 277, 301, 60/306, 289, 290

[56] References Cited

U.S. PATENT DOCUMENTS 5,056,308  10/1991  Kume ............................... 60/276

FOREIGN PATENT DOCUMENTS

| 19810 | 2/1977 | Japan | 60/276 |
| 19811 | 2/1977 | Japan | 60/276 |
| 70017 | 4/1983 | Japan | 60/277 |
| 243316 | 12/1985 | Japan | 60/276 |
| 248908 | 10/1988 | Japan | 60/276 |

Primary Examiner—Douglas Hart
Attorney, Agent, or Firm—Howard N. Conkey

[57] ABSTRACT

A comprehensive air injection system diagnostic uses hardware already available on many vehicle exhaust systems to monitor the oxygen content of the exhaust, so as to indicate steady state oxygen levels therein that are not in accord with the present state of the air injection system, and accordingly are assumed to be the result of a failure in the air injection system.

3 Claims, 3 Drawing Sheets

AIR INJECTION SYSTEM DIAGNOSTIC

BACKGROUND OF THE INVENTION

The introduction of fresh air into the exhaust path of internal combustion engines has been shown to reduce levels of undesirable emissions in automotive vehicles. Consequently, air management systems AMS, or systems used to control how much, when and where air is introduced into vehicle exhaust, are commonly used in conventional emission control strategies. The reliability of these systems is encumbered by their complexity and by the harsh environments in which they necessarily must operate. AMS faults can result in unfavorable oxygen levels in vehicle emissions which can lead to catalytic converter damage or unacceptable vehicle emissions. As such, the detection of faults in these systems, such that they may be promptly treated, facilitates the goal of improving vehicle emissions.

Conventional systems that attempt to detect some AMS faults exist in the art. Commonly, they may use a single oxygen sensor to detect AMS faults, where the sensor should indicate an excess of oxygen in the exhaust when fresh air is being injected into the exhaust. Other conventional systems use off-board techniques to diagnose the integrity of AMS systems.

The single sensor systems use a sensor already available in the exhaust path for engine air-fuel ratio control. This sensor is commonly attached to the exhaust manifold of the engine, and thus cannot monitor air injection at points in the exhaust path after the sensor, for example in the catalytic converter. In dual bank engines, where the sensor is commonly located on one bank and air is injected in the other bank, AMS faults affecting the injection point on the bank cannot be detected. Additionally, if the single sensor fails, the air management system is left without on-board fault detection recourse.

The off-line techniques are subject to the shortcomings of inconvenience and the potential for substantial delay between the time the failure occurs and the time it is diagnosed. Without some indication of a failure, the driver will not likely submit the vehicle to off-line testing, unless some external motivation exists. Even with such a motivation, the period between the time of the failure and the time of the diagnosis of the failure through a routine test may be substantial.

SUMMARY OF THE INVENTION

The present invention overcomes the shortcomings of the prior systems in that it provides on-line analysis of AMS integrity with sensors located downstream of conventional air injection points in the exhaust path.

Generally, this invention uses oxygen sensors located at predetermined points in the exhaust path of a vehicle to sense whether or not the exhaust gas has a comparatively high oxygen content. The oxygen content status is communicated to a control system, which also has information on the current status of the air injection system. The control system correlates the status of the air injection system with the sensed values such that it may determine if air commanded to be injected into the exhaust path is actually being injected, i.e. if sensors downstream of the active air injector indicate a relatively high oxygen content.

If the sensors show a relatively high oxygen content downstream of the active injector, the system is assumed to be operating normally. If all sensors indicate that the oxygen content is not relatively high, an air injection system fault is assumed to exist and the vehicle operator is so apprised. Finally, if sensors along a common uninterrupted exhaust path disagree with each other, the sensor that agrees with the air injection system current state may be assumed valid, the other sensor may be assumed faulty, and the vehicle operator is so apprised.

It should be noted that in some sensor configurations contemplated by the inventors, the multiple sensors will not, under normal operation, agree with each other. For example, the sensors are monitoring different branches of the exhaust path, or are interceded by an exhaust element that affects the oxygen level of the exhaust gas. In these cases, pure redundancy may not be possible with the sensors such that sensor cross-verification will not be possible.

This invention is not limited to AMS fault detection at single points in the exhaust. Additionally, a failure of one sensor does not result in total loss in AMS monitoring capability. Finally, the dual sensors can provide a means of cross-verification in some configurations, providing an objective means of fault detection.

DESCRIPTION OF THE ILLUSTRATIONS

DESCRIPTION OF THE PREFERRED EMBODIMENT

Figure 1:
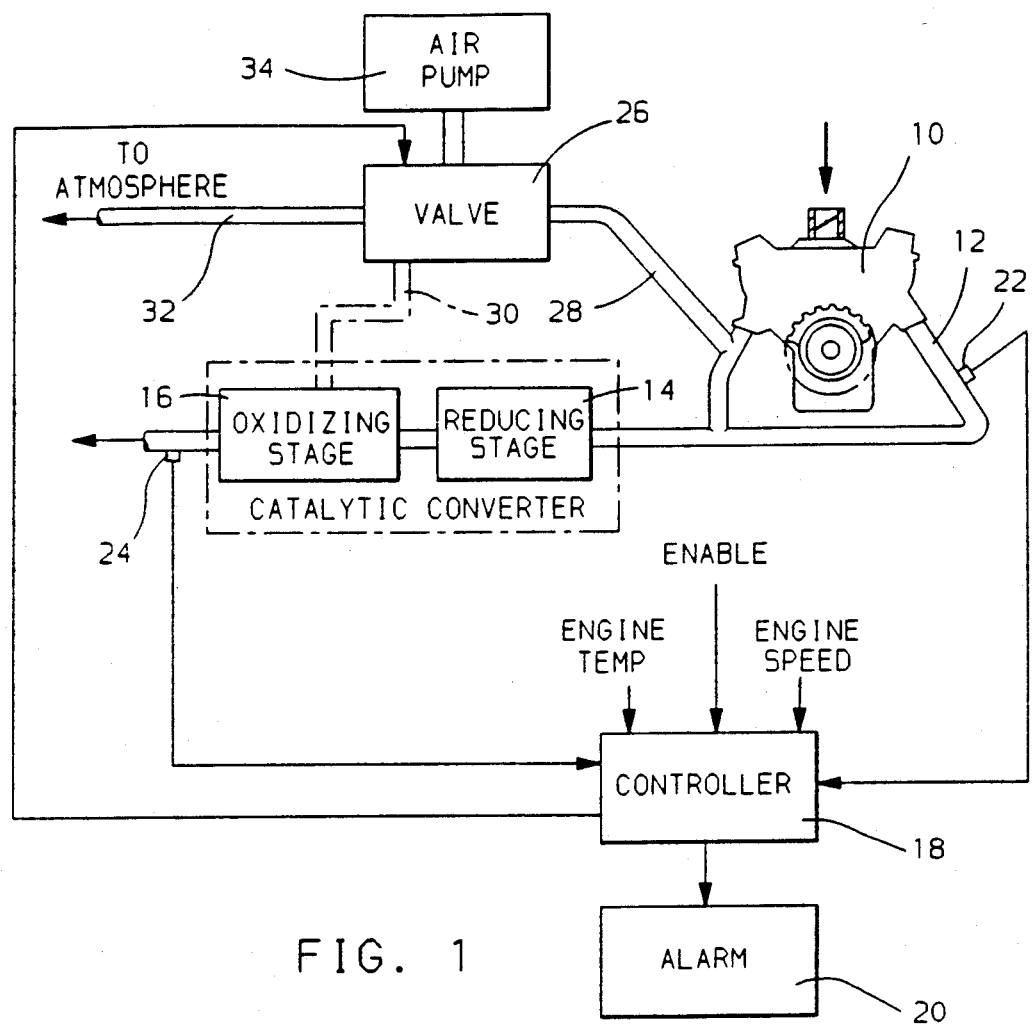
FIG. 1 is a general block diagram of a an air management system in accord with this embodiment incorporating the principles of this invention.

Referring to FIG. 1, a vehicle internal combustion engine 10 is driven in a conventional manner to apply driving torque to the vehicle driven wheels. Air is drawn into the engine 10 and is mixed with fuel injected into the engine. The air-fuel mixture is drawn into the cylinders of the engine where it undergoes ignition thereby generating the torque to be applied to the driven wheels.

The exhaust gas generated in the engine is guided out via the engine exhaust system 12, which may include a conventional two-stage catalytic converter, including a reducing stage 14, and an oxidizing stage 16.

Returning to FIG. 1, oxygen sensors are associated with the exhaust path so as to measure the oxygen content of the exhaust gas passing by the sensors. One sensor 24 may be located downstream of the catalytic converter, or one 22 may be located in the exhaust manifold. In the preferred embodiment, a sensor is located in both positions, one sensor 22 is located in the exhaust manifold to monitor the air-fuel ratio of the engine in a conventional manner, and another is located downstream of the catalytic converter, which can be used for air management system diagnostics in accord with the principles of this invention.

The oxygen sensors, especially the sensor 22 located in the exhaust manifold, are available in many conventional engine control systems for controlling the engine air-fuel ratio under certain engine operating conditions. Generally, this is accomplished by sensing the oxygen content in the exhaust gas at a predetermined point, for example using the sensor 22 located in the exhaust manifold, and adjusting the ratio of fuel to air into the engine based on the sensed oxygen content so as to maintain the air-fuel ratio at or near the stoichiometric ratio.

If an excess of oxygen is sensed in the exhaust gas, indicating an air-fuel ratio in excess of the stoichiometric ratio, the air-fuel ratio will be decreased, for example by increasing the amount of fuel injected into the engine for a given amount of air into the engine. The exhaust gas generated from engine operation under that increased fuel intake charge will have a reduced oxygen content due primarily to the increased engine burn capacity.

Accordingly, as the engine operating cycles continue, the oxygen content in the exhaust will be reduced in the described manner until eventually the sensed exhaust gas oxygen content indicates an engine air-fuel ratio below the stoichiometric ratio. The engine controller will then increase the engine air-fuel ratio, thereby driving up the exhaust gas oxygen content until the oxygen sensor 22 indicates an excess of oxygen, at which time this closed loop air fuel ratio control process will repeat. One result of this closed loop control process is the oscillation of the oxygen sensor 22 between high and low oxygen content readings under normal engine operation.

Also associated with the engine is an air management system including the valve control unit 26 controlled by a valve controller 18. The valve control unit is connected to a conventional air pump 34, which, when active, provides the valve control unit with a supply of air. The valve control unit has several conduits by which the air is conducted to a series of points along the exhaust path.

In this embodiment, one such conduit 28 is connected from the valve control unit 26 to the engine exhaust manifold. A typical engine is illustrated in FIG. 1, having two exhaust banks. In this embodiment, consistent with many conventional systems, the air supply conduit 28 is connected to one bank, and the oxygen sensor 22 is attached to the other bank. In such systems, the integrity of the injection into the banks cannot be monitored by the oxygen sensor 22.

In a second embodiment including the two stage catalytic converter, a closed air path 30 may run from the valve control unit 26 to a point in the exhaust path in proximity to the converter. FIG. 1 shows operation with a conventional two stage converter, as discussed. In common two stage converters, air is injected into the oxidizing stage 16 via the air management system including the closed air path 30 between the air management system valve control unit 26 and the oxidizing stage 16. The injection of air into the oxidizing stage increases the oxygen content of the air present therein.

By increasing the oxygen content in this manner, the second stage can reduce the levels of CO and HC in the exhaust gas in an manner common in the art of emission control. No air is injected into the reducing stage 14, which is designed to reduce the level of oxides of nitrogen $NO_x$ in the exhaust gas. Such a reduced level of oxygen keeps gas temperature down, which reduces $NO_x$ production, and further reduces the production of $NO_x$ by reducing the availability of one of its constituent elements.

It should be noted that this invention also applies to systems that do not have a two stage catalytic converter, such as systems with a three way, single stage converter, or no converter at all. Additionally, in a third embodiment, a relief conduit 32 may be connected from the valve control unit 26 to the the open atmosphere, so as to allow the valve control unit to have a means of air escape when no air is to be injected into the exhaust path.

A variety of combinations of the above conduits and of the above oxygen sensors may be used within the scope of this invention, or additional conduits and sensors may be included without departing from the principles of this invention. This invention is intended to operate as a means of diagnosing faults in any air injection system that injects air into the exhaust path of an engine.

Figure 2:
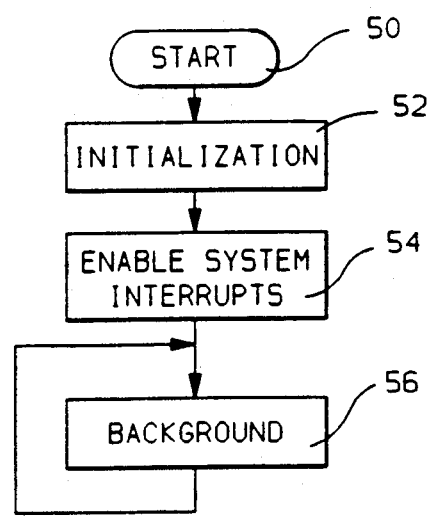
FIGS. 2 and 3a and 3b are computer flow diagrams illustrating the step involved in carrying out the principles of this invention in accord with this embodiment.

Referring to FIG. 2, when the system is started, such as when the engine ignition is turned to its on position, the general engine control routine starts at step 50, and proceeds to step 52, where initialization takes place. At this step data is transferred from ROM locations to RAM locations, and pointers, flags and counters are initialized.

Next, at step 54, system interrupts are enabled to activate at predetermined periodic intervals. The interrupt used to initiate the routine incorporating the principles of this invention is initialized at this point.

The routine then proceeds to a background loop at step 56, which is continuously repeated while the system is operating. The background loop may contain system maintenance and diagnostic routines. The loop may be interrupted by one of possibly several system interrupts, and thereby control will be shifted to the appropriate interrupt service routine.

Figure 3A:
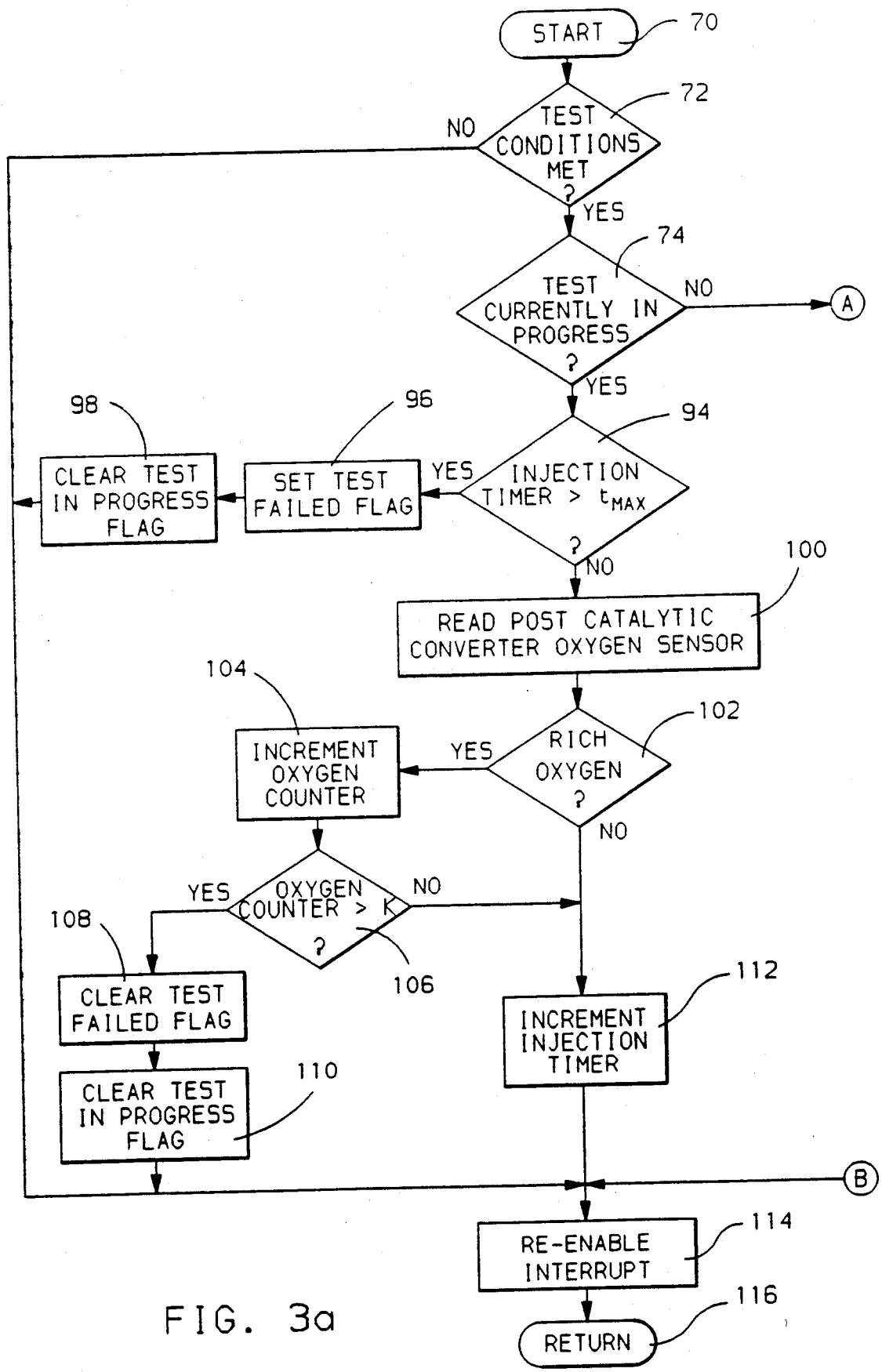
Figure 3B:
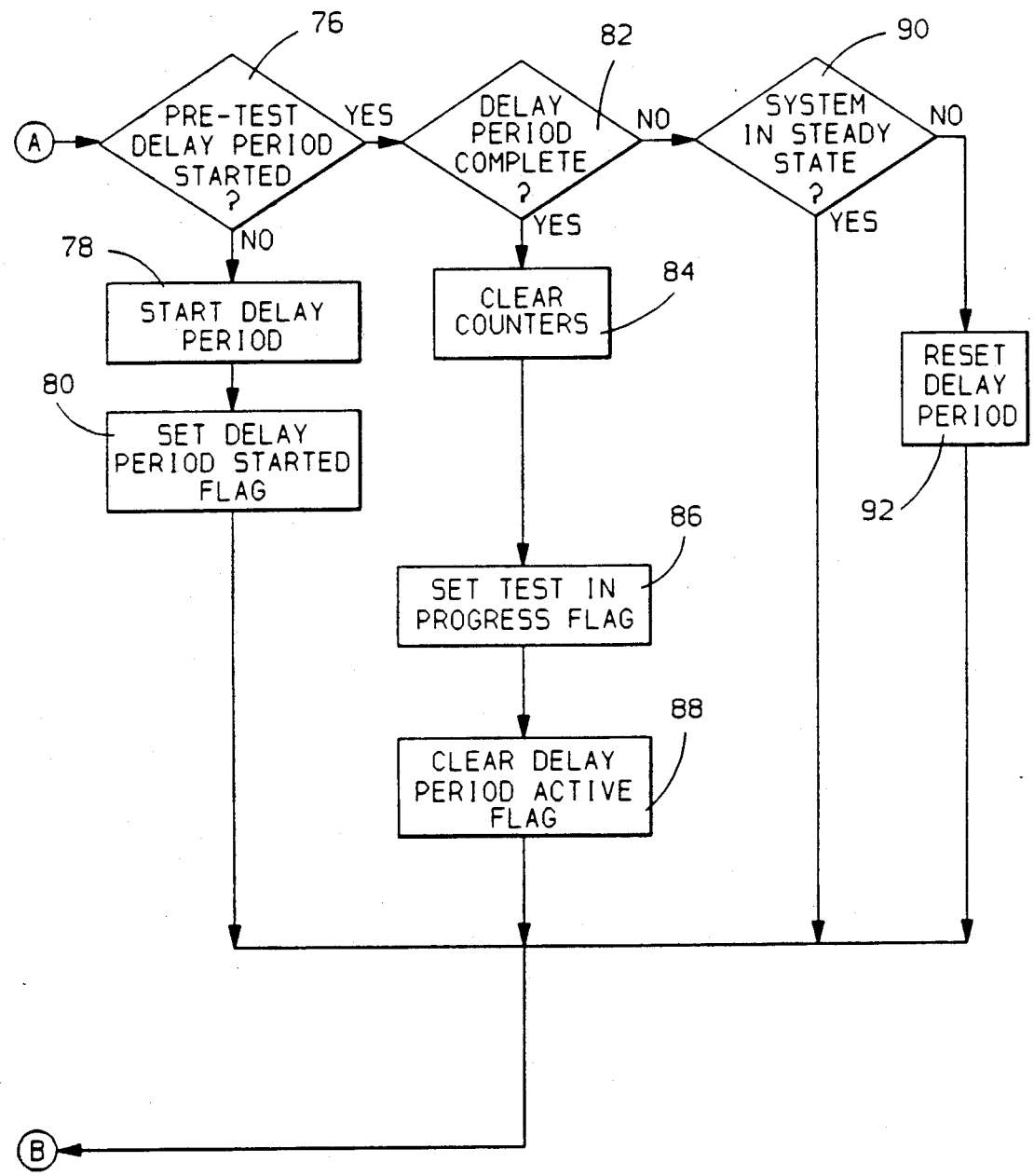

The service routine incorporating the, principles of this invention is illustrated in FIGS. 3a and 3b, and, in the preferred embodiment, is initialized to execute every 100 milliseconds. This routine starts at step 70 and proceeds to step 72 where predetermined conditions are checked. In this embodiment, these conditions comprise checking whether air is currently being injected into the exhaust path of the system, whether prior malfunctions have been diagnosed that would interfere with the operation of this routine, and, generally, whether the test in accord with the principles of this invention would produce meaningful results.

In this embodiment, a test may be made less meaningful if the engine is operating in a high load mode or in a low load mode. In these cases, the exhaust gas composition is distorted such that the oxygen content therein is assumed to be unpredictable.

Accordingly, if any of the above described conditions are not met, the present iteration of the test in accord with the principles of this invention is aborted at step 72, and the routine proceeds to step 114, to re-enable the interrupt used to execute this routine. In this embodiment, this interrupt is re-enabled to occur 100 milliseconds from the time of the last of such interrupts. The routine then moves to step 116, where it is directed to return to the background routine illustrated at step 56 of the routine of FIG. 2.

Alternatively, if all of the conditions are met at step 72, the routine proceeds to step 74 to check a test in progress flag. If the flag is set, the test in accord with this invention has already been started, and the routine proceeds to steps 94 through 112 to continue the test. If the test in progress flag is not set, the routine proceeds to steps 76 through 92 (FIG. 3b) to determine if conditions other than those discussed above permit the test in accord with this invention.

Specifically, at step 76 the routine determines whether a pretest delay period has been started. The delay period is a predetermined period of time, prior to an exhaust oxygen content test in accord with this invention, during which the engine operating state is analyzed to determine whether the engine is operating in a sufficiently steady state so as to allow accurate testing to occur. If the vehicle is substantially accelerating or decelerating, the oxygen content in the exhaust will generally not be sufficiently in a steady state to allow meaningful testing against predetermined oxygen levels to take place. As such, the test is not performed unless the engine operating point is sufficiently steady over the delay period. The delay period may be maintained by a conventional timer or counter, which, in a step not shown, is periodically decremented while the delay period is active.

Accordingly, if at step 76 the delay period has begun, the routine proceeds to step 82, to determine if the delay period has been completed without interruption. If so, the system, over the entire delay period, was found to be sufficiently steady so as to allow the test to continue, and the routine proceeds to steps 84 through 88, to prepare for the start of the test. Specifically, at step 84, any counters used in the test are cleared. Next, at step 86, a test in progress flag is set. The routine then proceeds to step 88, to clear the flag indicating that the delay period is active. The routine then re-enables the parent interrupt at step 114, and then, at step 116, returns to the background routine of FIG. 2.

Alternatively, at step 82, if the delay period is not complete, the routine moves to step 90, where the "steadiness" of the system is checked, as discussed. The steadiness may be checked by monitoring the engine operating point. If the operating point varies appreciably over the tenure of the pretest delay period, the system may be assumed to be insufficiently steady to allow the test in accord with this invention to proceed.

Accordingly if, during any iteration of the routine while the pretest delay period is active, the system is deemed insufficiently steady, the delay period is reset at step 92, such that another entire pretest delay period must pass with sufficient "steadiness" before the test in accord with the principles of this invention can take place.

However, if the system is found to be sufficiently steady over the pretest delay period, the air management diagnostic will execute. During each iteration of the routine of FIGS. 3a and 3b while the pretest delay period is active, if the system is found to be within the predetermined steady state, the routine exits by resetting the parent interrupt at step 114 and returns to the background routine of FIG. 2, via step 116.

Returning to step 76, if the pretest delay period has not started, the routine moves to step 78, where the period is started. Next, the routine proceeds to step 80, where the flag indicating that the pretest delay period has started is set. The routine then re-enables the calling interrupt at step 114 and, via step 116, returns to the background loop illustrated in FIG. 2.

If, at step 74, (FIG. 3a) the test in progress flag is set indicating the test is underway as discussed, the routine proceeds to step 94, where the injector timer is compared to a predetermined timer limit value $t_{MAX}$. The timer limit value $t_{MAX}$ is based on the rich oxygen counter limit value (to be discussed) and represents the amount of time deemed necessary for the rich oxygen counter to increment from zero to a predetermined counter limit value. Accordingly, if the injector timer, which is incremented each time the routine of FIG. 3 is executed, is incremented from zero to $t_{MAX}$ before the rich oxygen counter reaches its counter limit value, an error in the oxygen injection means is assumed to have occurred.

Specifically at step 94, the injection timer is compared to $t_{MAX}$. If the timer exceeds $t_{MAX}$, meaning that the predesignated time limit has elapsed before the rich oxygen counter has reached its predesignated limit value, the routine proceeds to step 96, where a test failed flag is set in system memory. This flag may be stored in some non-volatile memory so as to be available to one later servicing the vehicle, and may be accompanied by a warning to the driver, for example by illuminating a light on the vehicle instrument panel, to provide the driver with appropriate notice of the detected fault.

Next, the routine proceeds to step 98, where the test in progress flag is cleared, indicating that the test is complete. The routine then proceeds to step 144 to re-enable the parent interrupt, and then to step 116, where it returns to the background routine of FIG. 2.

Returning to step 94, if the injection timer has not reached the predetermined limit, the routine proceeds to step 100, to read the conventional oxygen sensor 24, located downstream of the catalytic converter in this embodiment. The sensor may simply indicate whether or not there is an excess of oxygen in the exhaust gas. Therefore, at step 102, if a rich oxygen condition is sensed, presumably consistent with the status of the air injection system, the routine proceeds to step 104, to increment the oxygen counter. An air management system failure will be assumed unless the oxygen counter, via incremental increases at step 104, reaches a predetermined limit value before the previously discussed injection timer reaches its predetermined limit value.

Other, more sophisticated oxygen sensors may be used to sense the level of oxygen in the exhaust path within the scope of this invention. The inventors envision application of this invention to sensors capable of not only determining whether the oxygen level in the exhaust is simply rich or lean, but sensors that can determine the approximate concentration of oxygen in the exhaust. The routine in accord with this invention would be substantially the same with the more sophisticated sensors, except that the sensed concentration would be compared to a predetermined concentration threshold at step 102 to determine whether the exhaust was oxygen rich or oxygen lean for each iteration of the routine.

After incrementing the oxygen counter at step 104, the routine proceeds to step 106, to compare the rich oxygen counter to the predetermined counter limit value. If the oxygen counter exceeds the limit, the oxygen content in the exhaust has been rich for an amount of time that would indicate that the air management system is injecting air into the exhaust in the expected manner, and as such the system is assumed to be operating properly.

The routine then proceeds to step 108, to clear any previous test failed flags, and the proceeds to step 110, to clear the test in progress flag, thereby indicating the completion of the present test.

Alternatively, if the rich oxygen counter has not reached its predetermined limit value at step 106, or if the sensed oxygen level does not indicate a rich oxygen condition at step 102, the routine proceeds to step 112, where the injection timer is incremented. As discussed, this timer merely allows the rich oxygen counter a predetermined amount of time to count up to a predetermined value. If a sufficient number of rich oxygen levels are sensed, generally indicating that the oxygen level, subject to fluctuations, is rich over the time the test is being conducted, the test is passed. Otherwise, the test is failed, and it is assumed that the air management system is faulty.

After incrementing the injection counter at step 112, the routine proceeds to step 114, to re-enable the interrupt used to initiate this routine, as discussed. Next, the routine proceeds to step 116, where it returns to the background routine of FIG. 2.

In the second embodiment, the routine of FIGS. 3a and 3b may be used in substantially unchanged form to monitor the integrity of air injection into the oxidizing stage 16 of the catalytic converter, via the air injection conduit 30, as discussed. The location of the oxygen sensor 24, downstream of the oxidizing stage 16, allows monitoring of that injection point, in a manner nearly identical to that used to monitor air injection into the exhaust manifold in accord with the first embodiment. Differences in the application of the routine of FIGS. 3a and 3b to the two embodiments would lie simply in values assigned to calibration constants used in the execution of the routine.

Exhaust gas characteristics can change as the gas flows from the exhaust manifold, where sensing takes place in the first embodiment, to the point downstream of the oxidizing stage 16, where sensing takes place in the second embodiment. Consequently, the amount of time required to determine whether the system is in its steady state in the pretest delay period, the amount of time $t_{MAX}$ necessary to determine if the oxygen level in the exhaust is substantially rich or lean, and the number of counts necessary to determine if the gas is rich or lean during that time may change from the first to the second embodiment.

By properly calibrating and adjusting these constants from the first to the second embodiment, the routine illustrated in FIGS. 3a and 3b may be used to test the integrity of the air management system with either of these two embodiments.

In the third embodiment, the system described in FIG. 1 may be used to determine if the air injection system is diverting air properly, such that, while the air pump 34 may still be operating, the air is being driven to the atmosphere, rather than to a point in the engine exhaust path.

To verify that the air is being diverted properly, the air management system in accord with this invention will monitor the oxygen level in the engine exhaust path in a manner identical to that described in the first embodiment, with only a few exceptions. Different test conditions must be met at step 72, as the air management system must be in divert mode for this test in a accord with this third embodiment to take place.

Accordingly, the routine at step 72 checks for such conditions as would cause the air management system to divert air, such as being in a high power operating mode or in a low power operating mode. In such cases, the routine will proceed to steps 74 through 92 which will be executed in the same manner as was described in the first embodiment. At step 94, the third embodiment diverges form the first in that, depending on the system this routine is applied to, $t_{MAX}$ may take on a different value during the system calibration.

In this embodiment, $t_{MAX}$ should correspond to the amount of time appropriate for the test used to determine whether air is being properly diverted in accord with this embodiment. If the time allowed for the test has expired at step 94, the routine proceeds to steps 96 and 98 in the manner described in the first embodiment.

Figure 4:
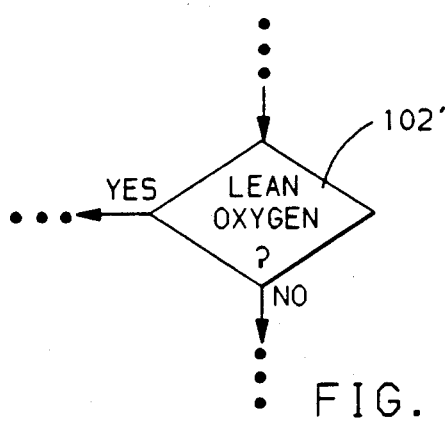
FIG. 4 is a computer flow diagram illustrating the steps involved in carrying out the principles of this invention in accord with a second embodiment.

Alternatively, if the test has not timed out at step 94, the routine proceeds to step 100 to read the post-catalytic converter oxygen sensor 24, as was described in the first embodiment. Next the routine proceeds to step 102, which, in this embodiment is shown in FIG. 4 as step 102'. At this step the routine determines whether the oxygen sensor indicates exhaust gas that is oxygen lean or oxygen rich. In this embodiment, a conventional oxygen sensor 24 is used to sense the oxygen level in the exhaust. The output of the sensor simply indicates a rich or lean oxygen condition, as was described in the first embodiment. However, more sophisticated sensors may be used without departing from the scope of this invention, in the manner described in the first embodiment.

Accordingly, if at step 102' the oxygen sensor indicates a lean oxygen condition, the test has been passed for this iteration, and the routine proceeds to step 104 through 110 to determine whether the test has been passed for a sufficient number of iterations so as to diagnose the air management system as "healthy".

Specifically, the routine proceeds to step 104 to increment the oxygen counter, as was discussed in the first embodiment. Next, the routine at step 106 compares the oxygen counter to a predetermined constant K which, in a manner similar to that discussed in the first embodiment, is calibrated as the number of "in range" test iterations that should, within the test period allowed by the discussed injection timer $t_{MAX}$, determine with substantial certainty that the oxygen level in the exhaust path is within the expected range in its steady state. If the oxygen counter exceeds K at step 106, the test is passed, and the routine completes the iteration of the routine of FIG. 3a in the manner described in the first embodiment. If the counter does not exceed K, or if a rich oxygen condition was sensed at step 102', the routine moves to step 112, and proceeds through the remainder of the routine of FIG. 3a in the manner discussed in the first embodiment.

Several additional configurations are within the scope of this invention, and are not fully described above. For example, configurations in which two oxygen sensors are not interceded by the air injection point can be used to monitor faults not only in the air injection system, but in the oxygen sensors themselves. In this configuration, sensor self-checking may be carried out simply by expecting the two oxygen sensors to always be substantially in agreement. Only when air is injected at a point between the two sensors should they substantially disagree.

If the discussed consecutive sensors substantially disagree, i.e. do not show similar oxygen levels at the two points in the exhaust path, the sensor that agrees with the presumed status of the air management system (the sensor showing a normal oxygen level when air is being diverted, or the sensor showing an excess of oxygen when air is being injected into the path upstream of the two sensors) may be assumed to be correct, and the other may be assumed faulty, and ignored.

The probability of a contemporaneous fault in both an oxygen sensor and the air injection system, in relation to the probability of simply a fault in the disagreeing oxygen sensor warrants the assumption that the disagreeing sensor is faulty. Accordingly, the air injection system itself system is not diagnosed as faulty, and normal air injection is not interrupted.

Additional features may be associated with this self-checking configuration. First, indicating means may be associated with the system to indicate the existence of an oxygen sensing fault, and to distinguish which sensor is faulty. Second, the system may, to avoid subsequent confusion, remove the assumed faulty sensor from the analysis in accord with this configuration, retaining limited air injection fault detection capability. Presumably, the limited capability would not exist for an extended period of time, as the vehicle operator would, in response to an indicated fault indication, have the faulty sensor repaired.

The routine illustrated in FIGS. 3a and 3b may easily adapted to accommodate the main features of this self-checking fault detection configuration. To do so, steps 100 through 110 must be repeated for both oxygen sensors in turn. Otherwise, the routine illustrated in FIG. 3 would not change.

Accordingly in FIG. 3a, if the injection timer is less than the allowed injection time at step 94, the routine will proceed to read a first oxygen sensor, to increment a first oxygen counter if the sensor value indicates a rich oxygen condition, and to find no fault in the air injection system if the first oxygen counter exceeds a predetermined count threshold K.

Next, if the first oxygen sensor did not indicate a rich oxygen condition or if the first oxygen counter did not exceed K, the second oxygen sensor is read at a step equivalent to step 100 in FIG. 3a. Similar to the action taken with the first oxygen sensor, the routine will increment a second oxygen counter if the second oxygen sensor indicates a rich oxygen condition, and will then will find no fault in the air injection system if the second oxygen counter exceeds K.

If both the first and second oxygen counter do not exceed K, the test must continue, the injection timer will be incremented at a step equivalent to step 112 in FIG. 3a, and the routine will return to the calling routine via steps 114 and 116. However, if either oxygen counter exceeds K, the routine has failed to find an air injection fault irrespective of the status of the other counter, the test has been passed, the test failed flag is cleared at a step equivalent to step 108 of FIG. 3, and the test in progress flag is cleared at a step equivalent to step 110 of FIG. 3a, indicating the completion of the test in accord with this configuration.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A method for diagnosing failures in an air control system that controls a quantity of air admitted into an exhaust path of an internal combustion engine, comprising the steps of:

sensing the oxygen content of the exhaust gas of the engine at predetermined time intervals at a first predetermined point in the exhaust path of the engine, the oxygen content normally oscillating between a rich oxygen condition and a lean oxygen condition in the absence of air injected into the exhaust path above the first predetermined point;

injecting a quantity of air into the exhaust path of the engine at a second predetermined point in the exhaust path, the second predetermined point being above the first predetermined point;

counting the number of intervals at which the sensed oxygen content indicates a rich oxygen condition over a predetermined period of time;

comparing the counted number of rich oxygen intervals to a predetermined threshold value, the threshold value being greater than a counted number of rich oxygen intervals over the predetermined period of time resulting from the normal oscillations between rich and lean oxygen conditions in the absence of air injected into the exhaust path;

indicating the existence of a fault in the air control system when the number of rich oxygen intervals does not exceed the predetermined threshold value.

2. A method for diagnosing failures in an air control system that controls a quantity of air admitted into an exhaust path of an internal combustion engine, comprising the steps of:

sensing the oxygen content of exhaust gas in the exhaust path of the engine at a first predetermined point in the path;

injecting air into the exhaust path of the engine at a second predetermined points the second predetermined point being located after the first predetermined point in the exhaust path;

correcting the mixture of air and fuel admitted into the engine according to the sensed level of oxygen in the exhaust at the first predetermined point to maintain a predetermined desired oxygen content at the first predetermined point, said step of correcting the mixture of air and fuel resulting in the oxygen level in the exhaust oscillating between a rich oxygen condition and a lean oxygen condition at the first predetermined point;

sensing the oxygen content of exhaust gas in the exhaust path of the engine at a third predetermined point at predetermined time intervals, the third predetermined point being located after the second predetermined point in the exhaust path;

counting the number of intervals having an oxygen content indicating an excess of oxygen in the exhaust gas at the third predetermined point over a predetermined time period;

comparing the counted number of rich oxygen intervals to a predetermined threshold value, the threshold value being greater than a counted number of rich oxygen intervals over the predetermined period of time resulting from the normal oscillations between the rich and lean oxygen conditions in the absence of air injected into the exhaust path;

indicating the existence of a fault in the air control system when the number of intervals counted during the predetermined time period does not exceed the predetermined threshold value.

3. A method for diagnosing failures in an air control system that controls a quantity of air admitted into an exhaust path of an internal combustion engine, comprising the steps of:

injecting air into the exhaust path of the engine at a first predetermined point in the path;

sensing the oxygen content of exhaust gas in the exhaust path of the engine at each of a second and third predetermined points in the path during each of repeated time intervals, the second and third predetermined points being located after the first predetermined point in the exhaust path;

counting, over a predetermined time period, a first number of time intervals during which the sensed oxygen content at the second predetermined point indicates an excess of oxygen in the exhaust gas;

counting, over the predetermined time period, a second number of time intervals during which the sensed oxygen content at the third predetermined point indicates an excess of oxygen in the exhaust gas; and indicating the existence of a fault in the air control system when both of the counted first and second numbers of intervals are less than a predetermined count value, the existence of a fault condition not being indicated when at least one of the counted first and second number of intervals is greater than the predetermined count value.

* * * * *